W. R. JONES.
Process and Apparatus for Compressing Ingots While Casting.
No. 8,427. Reissued Sept. 24, 1878.
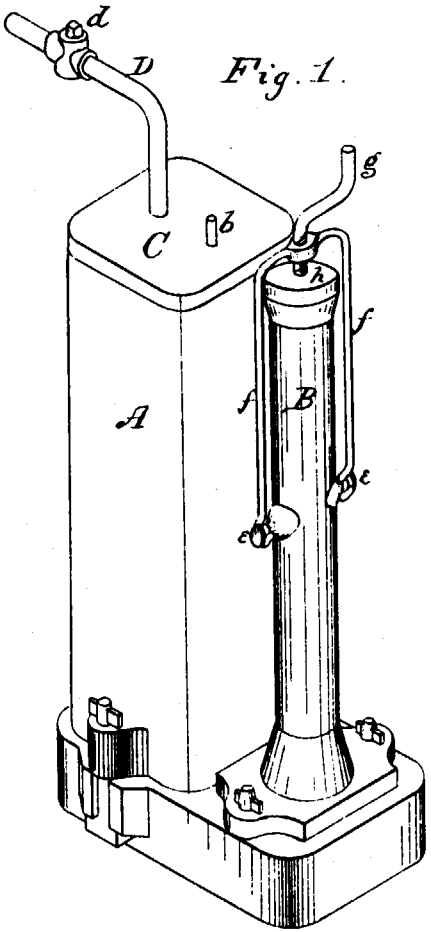
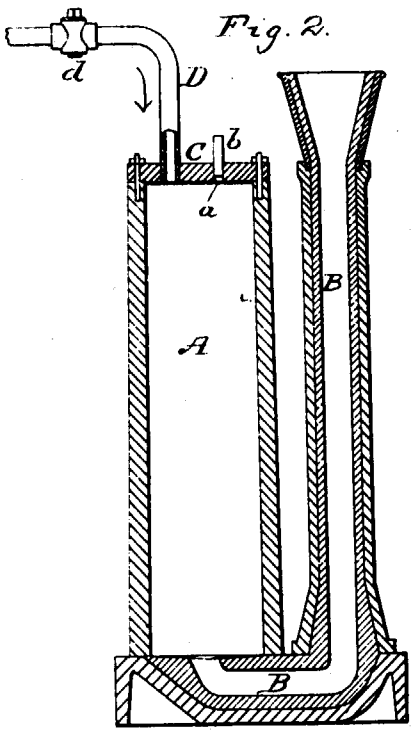
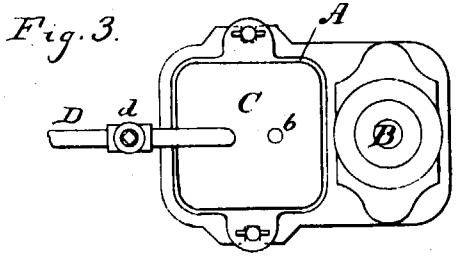
Witnesses.
J. B. Connally
A. Corcoran
Inventor.
W. R. Jones,
by Connally Bros & McTighe
Attys.

UNITED STATES PATENT OFFICE.

WILLIAM R. JONES, OF BRADDOCK, PENNSYLVANIA.

IMPROVEMENT IN PROCESS AND APPARATUS FOR COMPRESSING INGOTS WHILE CASTING.

Specification forming part of Letters Patent No. 186,576, dated January 23, 1877; Reissue No. 8,427, dated September 24, 1878; application filed May 13, 1878.

*To all whom it may concern:*

Be it known that I, WILLIAM R. JONES, of Braddock, in the county of Allegheny and State of Pennsylvania, have invented certain new and useful Improvements in Process and Apparatus for Compressing Ingots while Casting; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

The metal produced by the Bessemer process, as is well known, is honeycombed and extremely heterogeneous, and requires considerable reworking to compact it and render it of the requisite homogeneity for the uses to which it is to be applied. This defect in the ingot makes it practically impossible to secure a constant and invariable quality of finished material, no matter with how great precision and chemical accuracy the conversion is accomplished, because no two ingots will be honeycombed in the same manner or degree; and as there can be no positive determination of their interior, so there can be no accurate standard of comparison between one ingot and another as to the exact amount of hammering and rolling required to bring them to the same quality of product. This defect has been an ever-present obstacle to makers of Bessemer metal, and many attempts have been made to surmount it. All have been in one direction—namely, compression of the metal while in its fluid condition in the mold. This has been attempted by the following methods: A piston or plunger has been forced against the surface of the metal by steam-pressure. A plunger has been actuated under like conditions by hydraulic power. In both of these methods, while great pressure is brought to bear and the compression may be very great, it can never be perfect, because the existing "blow-holes" contain gases, which, while being compressible, cannot be destroyed, and, there being no outlet for them, they remain in the ingot. Another method has been attempted in various ways. It consists in subjecting the molten metal to the direct pressure of steam, compressed air, or expansive gases, in the following manner: An open-top ingot-mold is placed inside a large jacket of cast-iron, the metal is poured into the mold, the jacket then covered tightly, and, lastly, water is sprayed into the interior of the jacket, steam admitted, or explosives ignited. Now follow the actions taking place. Before any pressure can be exerted upon the contents of the mold, the steam or gas must first expand and fill the whole vessel and press upon the metal. This takes some appreciable time; but meanwhile condensation of the first portion takes place, since it is impracticable to heat the jackets to the temperature of the steam. In the meantime the metal rapidly chills and a crust forms, which will resist the subsequent pressure and prevent the escape of the gases contained in the metal. Besides all this the large and cumbersome jackets are costly and an impediment to rapid production.

The method by compressed air has been applied to the casting of car-wheels. The wheel is cast in a sand-mold, over whose ingate is attached a pressure-cylinder on top of the mold. Pouring is continued until not only the mold and ingate are filled, but the attached pressure-cylinder is also partly filled. Then compressed air is admitted above the metal in the cylinder, and its effect is claimed to be compression of the wheel inside the mold. While here again is a costly and cumbersome plant required to be fitted to each mold before pouring can be accomplished.

My invention is an improvement on the method of compressing by direct pressure of an elastic and expansive aeriform medium; and it consists in admitting the steam directly and only into the interior of the mold itself, the top of the mold being closed, whereby the pressure is at once exerted upon the metal without chilling or condensation, no time is lost in compression, and no extra plant is required; also, in the apparatus as hereinafter fully described.

The drawings illustrate the application of my improved process to a single ordinary bottom cast mold, Figure 1 being a perspective, Fig. 2 a vertical section, and Fig. 3 a plan view.

A designates the mold, and B its vertical sprue and ingate. This style being at present in general use and suitable to my purposes, I have adopted it, though other forms of mold may be used.

A strong lid, C, is tightly clamped to the mold by suitable means, and has a vent, *a*, for the escape of air and gases while pouring. A removable plug, *b*, fits vent *a*. Coming from a steam-boiler or other source, a pipe, D, passes through cover C and opens into the interior of mold A. Pipe D has, at a suitable point, a cock, *d*.

It may be desirable to have a flexion-joint on pipe D to facilitate handling.

On sprue B are two pivot-lugs, *e e*, which form a bearing for the removable bail *f*, which has a bearing-screw, *g*, to press upon the cover *h* of the sprue and bind it securely in place and against interior pressure.

Operation: Everything being ready, the cock *d* closed, vent *a* open, and sprue uncovered, the ladle is swung over the sprue and metal allowed to flow until mold A is nearly but not quite filled, leaving an open space between the top of the mold and the surface of the metal. Then the usual sand or loam is shoveled into the top of the sprue, its cover *h* applied, screw *g* tightened down, and plug *b* driven into vent *a*. Then cock *d* is opened, and the steam passes directly into the confined space between the metal and the cover of the mold. The pressure is instantaneously exerted upon the metal. No time is lost in filling a large and useless space with steam; no condensation takes place; but, on the contrary, superheating is effected; no apparatus except simply and solely the mold itself, and the pit is not crowded with useless obstacles to the movements of the workmen and the manipulations of the ladle. The pressure is not compelled to pass through a narrow ingate and diffuse itself, but is exerted directly upon the ingot. The steam being confined within the mold, its effect is immediate and thorough.

The gases confined in the blow-holes find a direct and unimpeded way into the elastic body of steam, and, as a consequence of the rapidity of action and the utilization of all the power, the metal is compressed into a perfectly solid and homogeneous mass before solidification can set in, and when cooled and cut exhibits a smooth and uniform structure throughout. The result is a perfectly uniform quality of ingot, which will give products of unvarying strength and durability.

I do not wish to be understood as claiming, broadly, the application of an elastic and expansive aeriform fluid directly upon the molten metal, as my invention is simply a specific improvement upon the method, as above broadly stated, and an apparatus for carrying it into effect.

What I do claim, and desire to secure by Letters Patent, is—

1. The herein-described improvement in the process of casting ingots under the direct pressure of an expansive aeriform fluid, the said improvement consisting in leaving an open space between the surface of the metal and the closed top of the mold and admitting the said expansive aeriform fluid directly into such space, substantially as described, whereby the full expansive force of the fluid is at once and directly exerted upon the contents of the mold, operations are facilitated, and the necessity of extra apparatus obviated.

2. In apparatus for compressing ingots while casting, the sprue B, provided with an adjustable cover, and the steam-supply pipe D, having a cock, *d*, in combination with the flask A, or group of flasks, having an outlet or outlets for the escape of air, and constructed substantially as described, so that the same may be opened and closed at will, as and for the purpose specified.

In testimony that I claim the foregoing I have hereunto set my hand this 8th day of May, 1878.

WILLIAM R. JONES.

Witnesses:
E. V. McCANDLESS,
THOMAS J. McTIGHE.